UNITED STATES PATENT OFFICE.

WILLIAM V. LOCKWOOD, OF BOSTON, MASSACHUSETTS, ASSIGNOR TO NATIONAL BELL TELEPHONE COMPANY, OF SAME PLACE.

GALVANIC BATTERY.

SPECIFICATION forming part of Letters Patent No. 227,801, dated May 18, 1880.

Application filed April 15, 1880. (No model.)

*To all whom it may concern:*

Be it known that I, WILLIAM V. LOCKWOOD, of Boston, in the State of Massachusetts, have invented an Improvement in Galvanic Batteries, of which the following is a specification.

The invention consists in adding sulphuric acid to peroxide of lead placed within the porous cell of a cup and forming one of the poles of the battery.

Heretofore peroxide of lead has been little used as the pole within the porous cell of a galvanic battery on account of the presence of impurities, more particularly nitrate of lead. The foreign salt decomposing forms a battery within the battery by chemically depositing the metal of the salt upon the zinc; but upon pouring a few drops of sulphuric acid into the cell containing the peroxide the nitrate of lead present, or other foreign salt, is precipitated, and the whole surface of the peroxide left free to work.

Otherwise the battery is constructed in the ordinary manner—a porous cup placed within a glass cup and provided with a carbon plate and crushed carbon, while the glass cup outside of the porous cup contains a solution of sal-ammoniac, or a similar solution, together with a zinc pole.

I claim—

A galvanic battery the porous cell of which contains peroxide of lead and sulphuric acid, the whole constructed substantially as described, for the purpose specified.

WM. V. LOCKWOOD.

Witnesses:
W. W. SWAN,
H. G. OLMSTED.